United States Patent [19]
Suzuki

[11] Patent Number: 5,578,811
[45] Date of Patent: Nov. 26, 1996

[54] INFORMATION RECORDING AND/OR REPRODUCING APPARATUS PROVIDED WITH OPTICAL CARD CARRYING MECHANISM

[75] Inventor: Kazunori Suzuki, Yokohama, Japan

[73] Assignee: Canon Kabushiki Kaisha, Tokyo, Japan

[21] Appl. No.: 431,567

[22] Filed: Apr. 27, 1995

[30] Foreign Application Priority Data

Apr. 28, 1994 [JP] Japan ................................ 6-114607

[51] Int. Cl.$^6$ .................................................. G06K 13/04
[52] U.S. Cl. .......................................... 235/479; 235/475
[58] Field of Search ........................... 235/479, 475

[56] References Cited

U.S. PATENT DOCUMENTS

4,907,098  3/1990  Ohkoda et al. ............................ 360/2
4,935,916  6/1990  Suzuki et al. ........................... 369/215
4,947,029  8/1990  Kurihara et al. ......................... 235/475
5,150,352  9/1992  Kurihara ................................... 235/479
5,262,629  11/1993  Hayashi et al. ........................ 235/479
5,264,687  11/1993  Sugiyama et al. ...................... 235/479

*Primary Examiner*—Harold Pitts
*Attorney, Agent, or Firm*—Fitzpatrick, Cella, Harper & Scinto

[57] ABSTRACT

An information recording and/or reproducing apparatus for recording and/or reproducing information in or from a card information recording medium with a recording and/or reproducing head, includes a carriage on which the medium is to be mounted, a carrying device for carrying the medium onto the carriage while keeping in contact with the medium, and a moving device for moving the carriage relative to the head. The carrying device is arranged to be free contact with the medium after the medium has been carried onto the carriage. The carrying device is a semicircular rubber roller, and a surface of a flat part of the rubber roller is placed in a state opposed to a surface of the medium after the medium has been carried onto the carriage, whereby the rubber roller is freed from contact with the medium.

3 Claims, 7 Drawing Sheets

INFORMATION RECORDING AND/OR REPRODUCING APPARATUS PROVIDED WITH OPTICAL CARD CARRYING MECHANISM

BACKGROUND OF THE INVENTION

1. Field of the Invention

The present invention relates to an information recording and/or reproducing apparatus (which performs at least one of recording and reproduction of information) provided with an optical card carrying mechanism for carrying an optical card, being an information recording medium, onto a carriage.

2. Related Background Art

Figure 1:
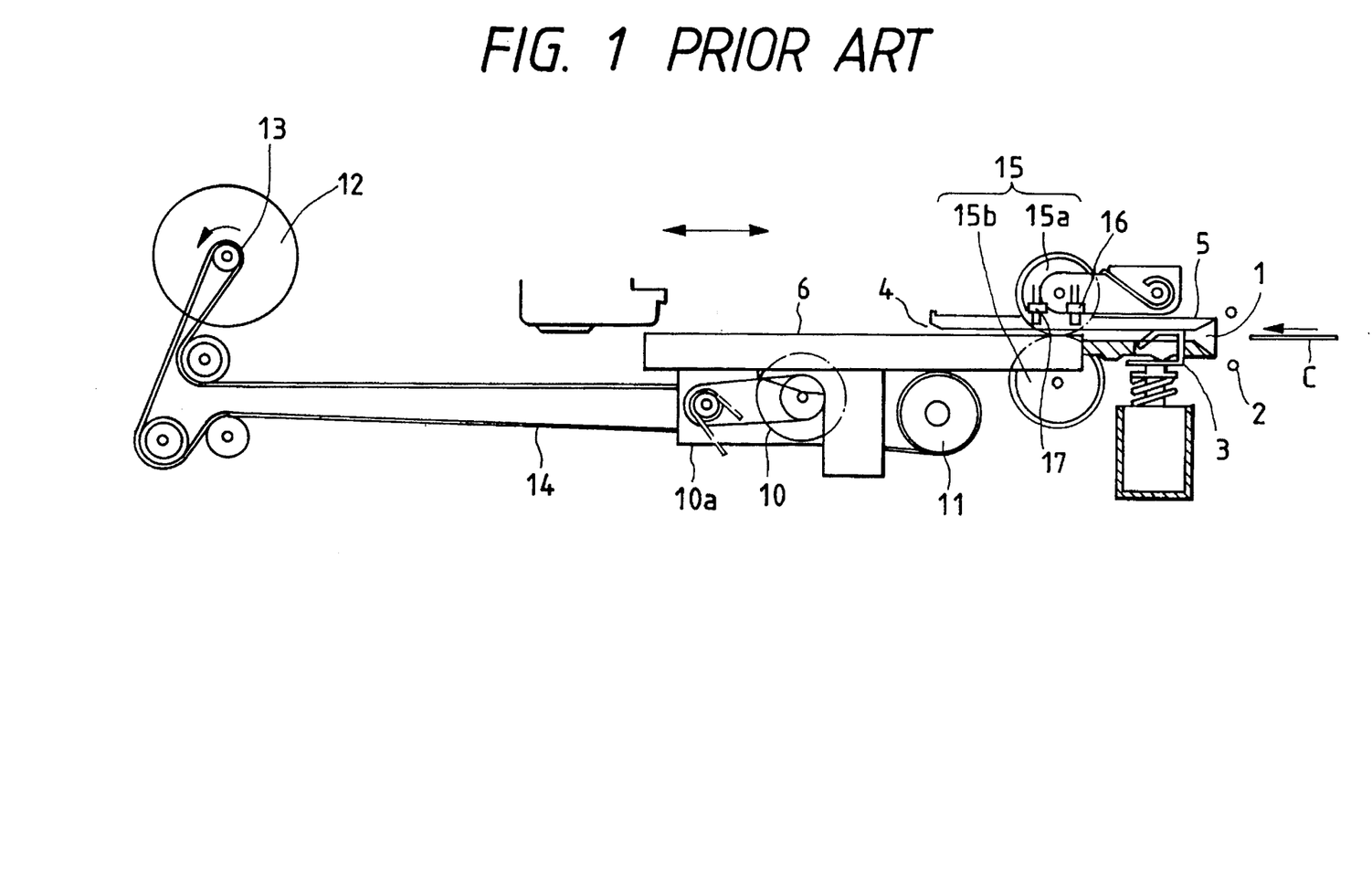
FIG. 1 shows structure of a conventional example.

There are magnetooptical disks, optical tapes, optical cards, etc. conventionally known as information recording media. In information recording and/or reproducing apparatus for recording or reproducing information on an optical card, an example of the optical card carrying mechanism for carrying the optical card onto the carriage and discharging it from the carriage is one as shown in FIG. 1. Describing it, a guide plate 5 is provided in such an arrangement that it has a card insertion slot 1 for an optical card C to be inserted therethrough in the longitudinal direction thereof at the fore end, a shutter 3 which opens and closes by the action of an action of sensor 2 at the card insertion slot 1, and a carrying path 4 communicating with the card insertion slot 1; and that on the rear end side of the guide plate 5 a carriage 6 for the card C to be mounted thereon with the top surface thereof along the carrying path 4 is placed with the fore end thereof being in contact with the guide plate 5.

Figure 2:
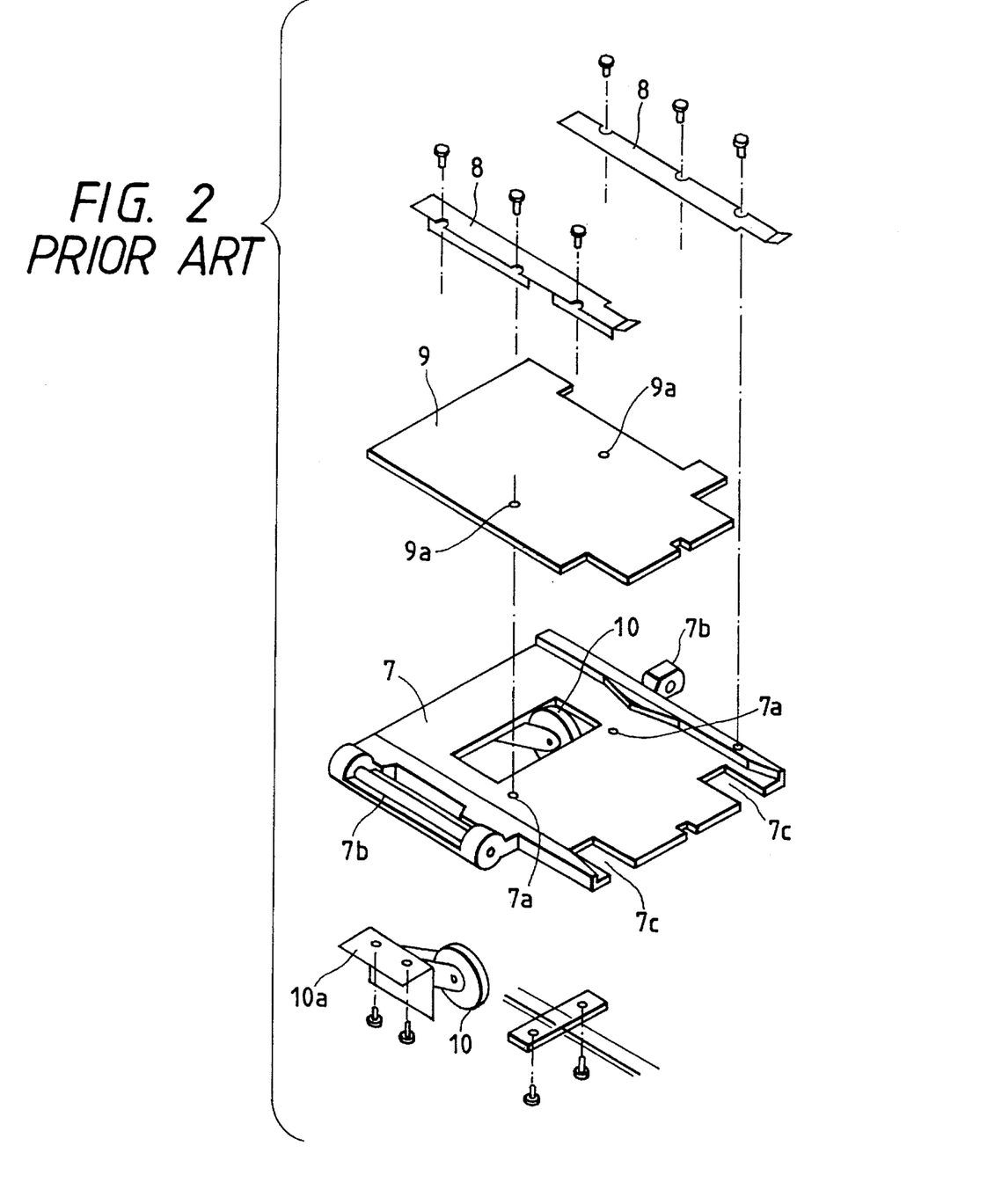
FIG. 2 is an exploded, perspective view of the carriage shown in FIG. 1.

The carriage 6 is composed, as shown in FIG. 2, of a carriage body 7, stop plates 8 attached to both sides of a top surface of the carriage body 7, a back panel 9 held between the carriage body 7 and the stop plates 8, and rollers 10, each attached through a support plate 10a to either side of a lower surface of the carriage body 7, for urging the back panel 9 upward. The back panel 9 is detachably mounted to the carriage body 7 by bringing pins 9a provided on either side thereof into free fit with pin holes 7a in the carriage body 7. Also, slide rings 7b, 7b are provided on either side of the carriage body 7 and cuts 7c are formed in the both sides of the fore end of the carriage body 7. Thus, the carriage body 7 is slidable as guided on unrepresented guide shafts parallel to the carrying path 4 through the slide rings 7b, 7b.

On the other hand, a pulley 11 is provided below the carriage 6, as shown in FIG. 1, a timing belt 4 is wound around a motor pulley 13 of motor 12 set over the rear end of the carriage 6 and also around a pulley 11, and the carriage 6 is attached to the timing belt 14. Further, a pair of upper and lower carrying rollers 15, being an upper press roller 15a and a lower drive roller 15b, are set on either side of the carrying path 4 and at a position of the fore end of the carriage 6, and the drive roller 15b is placed in the cut 7c of the carriage body 7. Also, sensors 16, 17 are provided at respective positions before and after the press roller 15a.

In this apparatus, when the optical card C is inserted through the card insert slot 1, the sensor 2 detects it to open the shutter 3, and the optical card C goes into the carrying path 4 in the guide plate 5. The sensors 16, 17 detect it in order to drive the carrying rollers 15. When the fore end of the card reaches the carrying rollers 15, it is pinched and carried between the carrying rollers 15 to be fed onto the carriage body 7 and then to be mounted on the carriage 6.

When the sensor 17 detects completion of card carry, the carrying rollers 15 stop and the back panel 9 urges the optical card C against the stop panel 8, thus completing mounting of the optical card C onto the carriage 6.

Subsequently, the motor 12 is driven to move the optical card C to a recording/reproducing position located on an extension of the carrying path 4. After completion of recording/reproducing processing, the motor 12 is reversed to return the carriage 6 to the home position where it is in contact with the guide plate 5.

Figure 3:
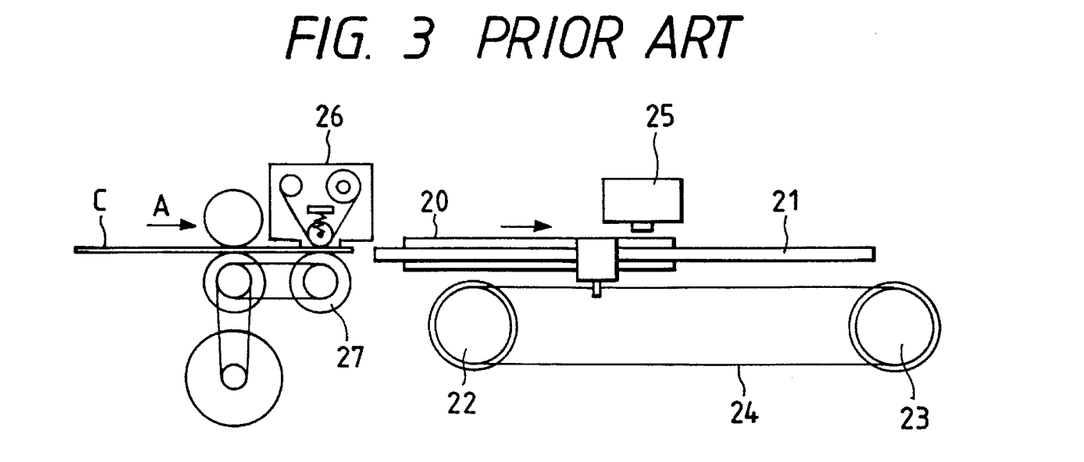
FIG. 3 is a structural drawing of another conventional example.

Another example of the conventional card carrying mechanism is one as shown in FIG. 3, in which a carriage 20 for holding the optical card C mounted thereon is slidably supported on a pair of guide shafts 21, and is attached to a belt 24 wound around pulleys 22, 23 set below the guide shafts 21, so that the carriage can translate along the carrying path in the longitudinal direction of optical card C. An optical head 25 is arranged as capable of translating in a direction perpendicular to the moving direction of the carriage 20.

Figure 4:
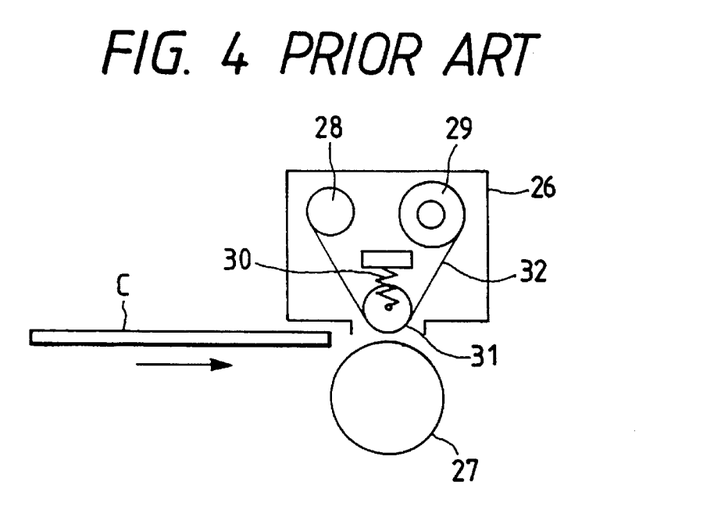
FIG. 4 is a structural drawing of the cleaning cartridge shown in FIG. 3.

A cleaning cartridge 26 and a carrying roller 27 are provided above and below the carrying path, respectively, on the insertion side of the carriage 20. Inside the cleaning cartridge 26, as shown in FIG. 4, there are two winding rollers 28, 29 extending in the direction perpendicular to the carrying direction of optical card C and a cleaning roller 31 pressed against the carrying roller 27 under a biasing force of press spring 30 between the rollers 28, 29. Thus, a belt cleaning member 32 wound between the winding rollers 28, 29 is guided between the cleaning roller 31 and the carrying roller 27 to be wound around one roller 29.

In this apparatus, when the optical card C is inserted, a card detecting sensor not shown starts driving the motor to rotate the carrying roller 27 so as to carry the optical card C in the direction of arrow A. Then, the cleaning member 32 in the cleaning cartridge 26 starts cleaning as rubbing the top surface of the optical card C.

However, an increase tendency of capacity of the Optical card is being driven these days and thus, a trend is to expand a recording surface up to limit positions on both edges in the transverse direction of the card in order to effectively utilize the recording surface. Therefore, in the case of the card carrying apparatus in the conventional examples shown in FIG. 1 and FIG. 2, the upper press roller 15a rubs the information recording surface of the optical card C upon insertion or discharge thereof because of such a positional relation that the carrying rollers 15 are set within the cuts 7c given in the carriage body 7. Such an arrangement is likely to cause dust to be attached to the recording surface or to cause scratches to be formed thereon, thus causing recording or reproducing errors. Further, when the carriage 6 returns to the home position after recording or reproduction, it collides with the press roller 15a and drive roller 15b, possibly damaging the fore end of optical card C and thus resulting in making it impossible to eject the optical card C from the carriage 6.

Since the carrying direction of optical card C is coincident with the moving direction of carriage 6, a force more than the carrying force of the carrying rollers 15 must work on the carriage body 7 in the opposite direction to the insertion direction of optical card C or the body must be locked with a force more than the carrying force, when the optical card C is introduced onto the carriage body 7 while being pinched between the carrying rollers 15 and comes into contact with a positioning stopper thereof. Therefore, greater power is necessary for the drive portion or the locking mechanism of the carriage body 7, resulting in increasing the scale of the driving apparatus. This will in turn cause an increase of the scale of the entire apparatus.

Also, the apparatus shown in FIG. 3 and FIG. 4 has problems of cost reduction and size reduction because the cleaning cartridge 26 is composed of a lot of components and because an installing space of the cartridge is necessary.

SUMMARY OF THE INVENTION

An object of the present invention is to provide a compact and cheap information recording and/or reproducing apparatus which can carry a recording medium therein without scratching the information recording surface of the recording medium and without damaging the recording medium.

The above object can be achieved by an information recording and/or reproducing apparatus for recording and/or reproducing information in or from a card information recording medium with a recording and/or reproducing head, which comprises a carriage on which the medium is to be mounted, carrying means for carrying the medium onto the carriage while keeping in contact with the medium, and moving means for moving the carriage relative to the head, and in which the carrying means is free from contact with the medium after the medium has been carried onto the carriage.

The details will be described in the following description of embodiments.

DESCRIPTION OF THE PREFERRED EMBODIMENTS

The present invention will be described in detail based on the embodiments shown in FIG. 5 to FIG. 11.

Figure 5:
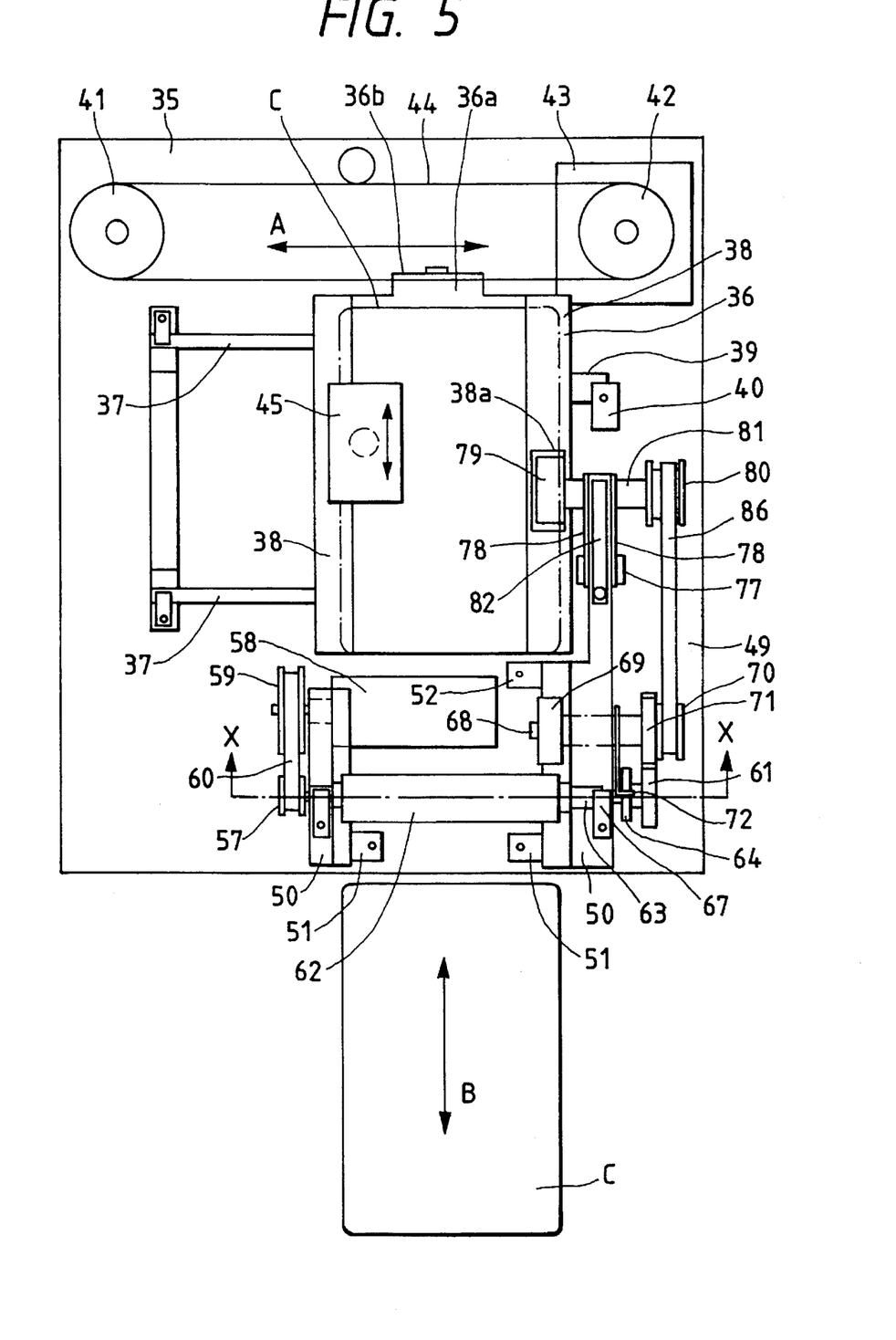
FIG. 5 is a structural drawing of an embodiment of the information recording and/or reproducing apparatus of the present invention.

FIG. 5 is a structural drawing of an example of the information recording and/or reproducing apparatus of the present invention. On a main body base 35 a rectangular carriage 36 nearly equal in size to an optical card C is arranged as slidable on a pair of parallel guide shafts 37, 37 extending in the transverse direction thereof. On the carriage 36, stop plates 38, 38 along both longer edges thereof are set with a clearance to the top surface of the carriage 36 so as to permit both edges of card C to be set therein, so that the optical card C can be introduced into between the stop plates 38 and the carriage 36. A card abutment portion 36a is provided at a far end in the card insertion direction of the carriage 36.

A light shielding plate 39 projects rightward from the right stop plate 38 to shield a home position sensor 40 on the body base 35, and a window 38a is formed nearly at a center position in the length direction of the stop plate 38. Mounted on the body base 35 are a pulley 41 and an ultrasonic motor 43 having a pulley 42, and a belt 44 is wound around the pulleys. The carriage 36 is fixed to the belt 44 through a projecting portion 36b provided at the far end in the card insertion direction, so that the carriage can translate on the guide rails 37 in directions of arrow A.

Above the carriage 36 there is provided an optical head 45 for recording and/or reproduction in such an arrangement that it can translate in the longitudinal direction of the carriage 36 along information tracks of optical card C on a guide not shown. An optical card carrying mechanism 49 is set on the body base 35 on the card insertion side of the carriage 36. In more detail, a pair of carrying bases 50, 50 are arranged in parallel as extending in the card insertion direction with a slightly wider gap than the transverse length of optical card C; card detection sensors 51, 51 are set as opposed to each other at the end portion on the opposite side to the carriage 36; and a card detection sensor 52 is provided only in one carrying base 50 at the other end portion.

Figure 6:
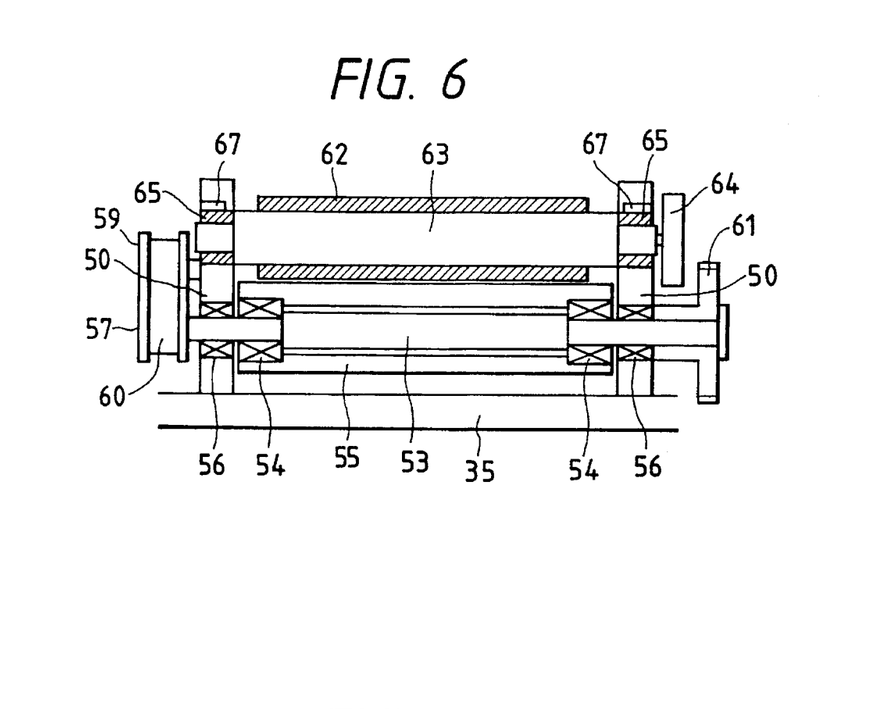
FIG. 6 is a cross-sectional view along the X—X line in FIG. 5.

As shown in FIG. 6 being a cross section along the X—X line in FIG. 5, a tubular, first carrying roller 55, which is attached to a rotational shaft 53 through one-way bearings 54, is supported on the carrying bases 50, 50 so that both ends of the rotational shaft 53 are rotatable through bearings 56, 10 56. A pulley 57 is attached to the left end of the rotational shaft 53, and a timing belt 60 is wound around a motor pulley 59 of a carrying motor 58 set on the body base 35, and around the pulley 57. A gear 61 is attached to the other end of the rotational shaft 53.

Figure 7:
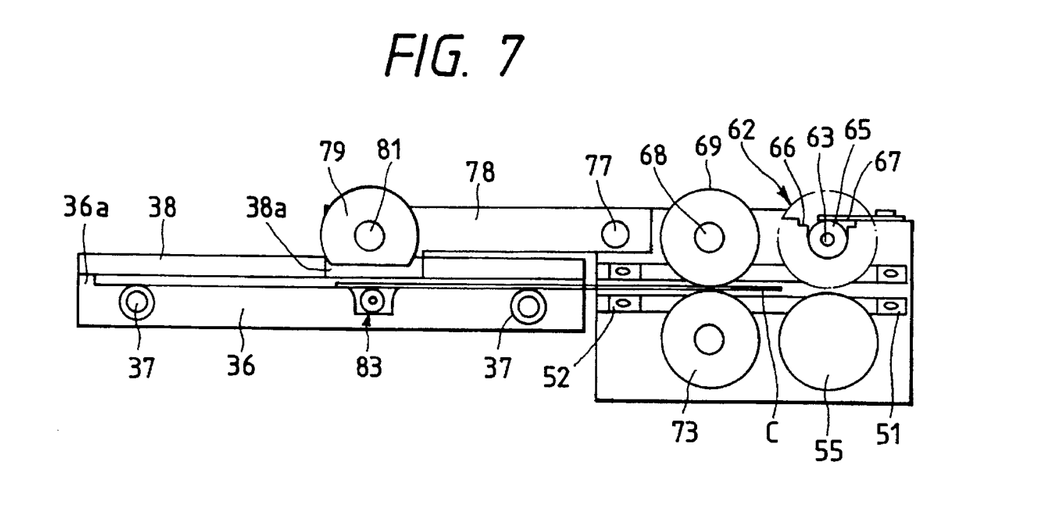
FIG. 7 is a side view of the optical card carrying mechanism shown in FIG. 5.
Figure 8:
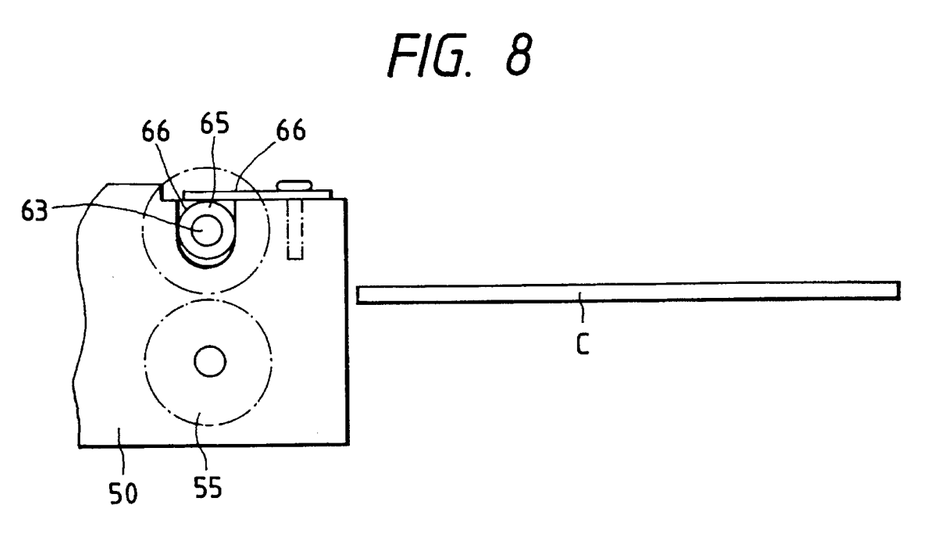
FIG. 8 is a partly enlarged, side view of FIG. 7.

Above the roller 55, a cleaning roller 62 is provided with a gap smaller than the thickness of the optical card C with respect to the roller 55, and both ends of a rotational shaft 63 thereof are supported on the carrying bases 50, 50. A ratchet gear 64 is attached to one end of the rotational shaft 63 projecting rightward. The rotational shaft 63 is supported, as shown in FIG. 7 and FIG. 8, through bearing metals 65 so as to be free to ascend or descend in recess portions 66 of a U-shaped cross section formed in the carrying bases 50, and is urged downward by plate springs 67 attached to the carrying bases 50 at one end.

The right carrying base 50 in FIG. 5 rotatably supports a second carrying roller 69 in parallel to the cleaning roller 62 through a support shaft 68 on the carriage 36 side with respect to the cleaning roller 62. A gear 71 integral with a pulley 70 is attached to the opposite end to the second carrying roller 69, of the support shaft 68. An L-shaped ratchet click 72 is rotatably held with a base thereof being sandwiched between a boss portion of gear 71 and the carrying base 50 and is urged in a direction for the tip thereof to engage with the ratchet gear 64. Below the second carrying roller 69, as shown in FIG. 7, a driven roller 73 opposed thereto is rotatably supported on the carrying base 50.

Further, a support shaft 77 is given at one end of the carrying base 50, and two plate arms 78, 78, having a length nearly to reach the center position of the carriage 36, are attached to the both ends of the support shaft 77. Rotatably supported at the tip portions of the arms is a shaft 81 to which a third carrying roller 79 of rubber in a semicircular shape is attached inside and to which a pulley 80 is fixed outside, as shown in FIG. 5. The third carrying roller 79 is located inside the window 38a provided in the stop plate 38; the arms 78, 78 are urged downward by a plate spring 82 attached at one end thereof to the top surface of the carrying base 50; and at least a gap more than the thickness of the optical card C is maintained between the third conveying roller 79 and the carriage 36 when a flat part of the third carrying roller 79 of semicircular shape is opposed to the top surface of the carriage 36. In the carriage 36 a recess portion is formed at a position opposed to the third carrying roller 79, as shown in FIG. 7, and a roller 83 is rotatably set in the recess portion so that the periphery thereof projects somewhat upward from the top surface of the carriage 36.

Figure 9:
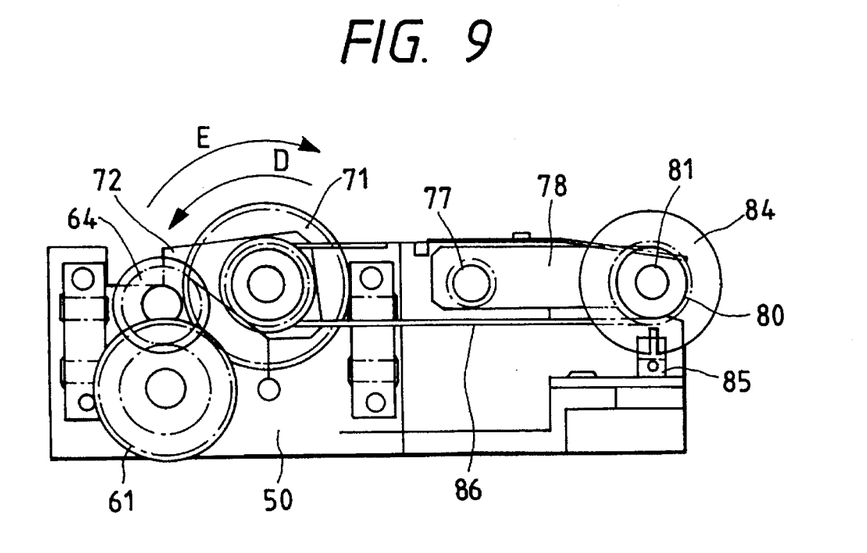
FIG. 9 is a side view of the optical card carrying mechanism shown in FIG. 5.

A slit disk 84 is fixed to the shaft 81, as shown in FIG. 9, and a slit detection sensor 85 is provided on the main body base 35. The slit disk 84 is so fixed that the slit thereof becomes opposed to the slit detection sensor 85 at a position where the flat part of the semicircular carrying roller 79 becomes parallel to the top surface of the carriage 36. A belt 86 is wound around the pulley 80 and pulley 70.

In the information recording and/or reproducing apparatus of the present invention, when the optical card C is inserted in the direction of arrow B into the optical card carrying mechanism 49, the detection sensors 51 detect it, and signals therefrom start driving the carrying motor 58 to rotate in the feed direction, thereby carrying the optical card C toward the carriage 36. Rotations of the carrying motor 58 are transmitted to the roller shaft 53 through the motor pulley 59, timing belt 60, and pulley 57 to rotate the first carrying roller 55 by the action of the one-way bearings 54; and the gear 61 fixed to the roller shaft 53 comes into mesh with the gear 71 fixed to the support shaft 68 of the second conveying roller 69, thereby rotating the second carrying roller 69. The optical card C carried by the first carrying roller 55 is pinched between the second carrying roller 69 and the driven roller 73 to be further fed toward the carriage 36.

On this occasion, the ratchet click 72 sandwiched between the boss portion of gear 71 and the carrying base 50 is pivoted in the D direction shown in FIG. 9 by a frictional force with rotation of the second conveying roller 69 as soon as the second conveying roller 69 starts rotating. Therefore, the tip of the ratchet click goes into between teeth of the ratchet gear 64 so as to keep the cleaning roller 62 from rotating. Since the bearing metals 65 attached to the rotational shaft 63 of cleaning roller 62 are urged downward by the plate springs 67, the cleaning roller 62 is kept in contact with the information recording surface of the optical card C fed by the first carrying roller 55 so as to clean the surface.

On the other hand, rotations of the second carrying roller 69 are transmitted from the pulley 70 integrally rotating with the gear 71 on the support shaft 68 through the belt 86 and pulley 80 to the shaft 81 so as to rotate the shaft 81, thereby rotating the third carrying roller 79 fixed to the shaft 81. Here, because the third carrying roller 79 is located inside the window 38a in the stop plate 38, a distance between the third roller 79 and the second carrying roller 69 is shorter than the length of the longer edges of the optical card C. Thus, when the fore end of the optical card C fed by the second carrying roller 69 and the driven roller 73 reaches the third carrying roller 79, the third carrying roller 79 smoothly receives the optical card C and pinches it with the roller 83 to carry it to the carriage 36.

From the point when the detection sensor 51 detects the rear edge of the optical card C being carried, the slit detection sensor 85 starts detecting a number of rotations of the third carrying roller 79 with the slit disk 84. Detection signals of the sensor 85 are sent to the CPU. When the number of rotations reaches a predetermined rotation number, the drive of the drive motor 58 is stopped. The optical card C is carried up to a position where the fore end thereof comes to abut on the abutment portion 36a of the carriage 36. Even after the optical card C comes to abut on the abutment portion 36a, the third carrying roller 79 continues slide-rotating on the surface of optical card C under a proper urging force of the plate spring 82 to the position where the surface of the flat part of the semicircular shape becomes parallel with the top surface of the carriage 36. Then the carrying operation of the optical card C onto the carriage 36 is ended.

The predetermined rotation number of the third carrying roller 79 is determined from a relation between a length of a contact circumference of one rotation and a distance to the abutment portion 36a of the carriage 36. A detection signal of the slit detection sensor 85 inputs a drive signal to the ultrasonic motor 43 through CPU.

After completion of carrying the optical card C onto the carriage 36, the ultrasonic motor 43 is driven to run the timing belt 44, and the carriage 36 is moved along the guide shafts 37. Thus, recording or reproduction is carried out for information tracks on the optical card C with the optical head 45, based on a command from CPU.

After completion of recording or reproduction, the carriage 36 is returned to the home position, where the light shielding plate 39 shields the home position sensor 40 to stop the ultrasonic motor 43. At this moment, the flat part of the third carrying roller 79 and the top surface of optical card C are stopped in a parallel state as upon insertion of card, thereby avoiding contact between the information recording surface and the third carrying roller 79. Then a signal from the home position sensor 40 is sent to the CPU, which drives the carrying motor 58 in the discharging direction to reverse the third carrying roller 79, takes the optical card C out of the carriage 36, and further carries it out by the second carrying roller 69. When the detection sensor 52 detects that the rear edge of the optical card C in the discharging direction passes past the detection sensor 52, the carrying motor 58 is stopped to end discharge of the optical card.

As soon as the carrying motor 58 drives in the discharging direction, the ratchet click 72 starts rotating in the E direction in FIG. 9. When the fore end of optical card C reaches the cleaning roller 62, the ratchet click 72 is already away from the ratchet gear 64, thereby keeping the cleaning roller 62 rotatable. Further, the first carrying roller 55 below the cleaning roller 62 is also rotatable relative to the rotational shaft 53 through the one-way bearings 54.

Accordingly, once the optical card C is pinched between the cleaning roller 62 and the first carrying roller 55 and carried by the second carrying roller 69 and the driven roller 73, the optical card C is discharged while letting the cleaning roller 62 and first carrying roller 55 idle. When the optical card C leaves the second carrying roller 69, it is nipped between the cleaning roller 62 and roller 55, and discharge thereof is ended in a state that a part of the card is exposed to the outside of the optical card carrying device 49.

Figure 10:
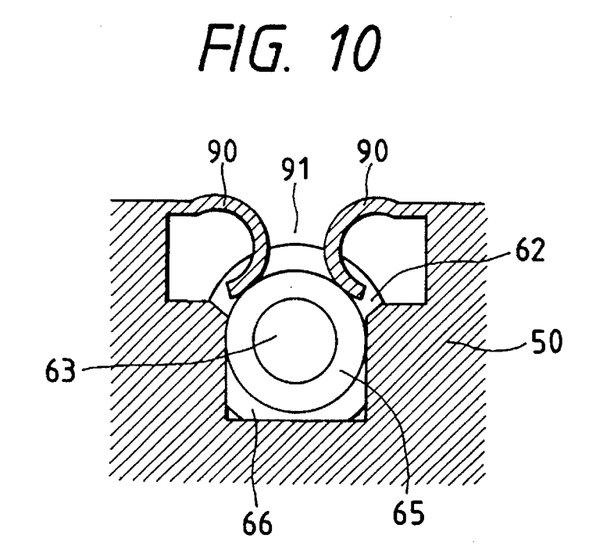
FIG. 10 is an enlarged, side view of a cleaning roller support portion in another embodiment.
Figure 11:
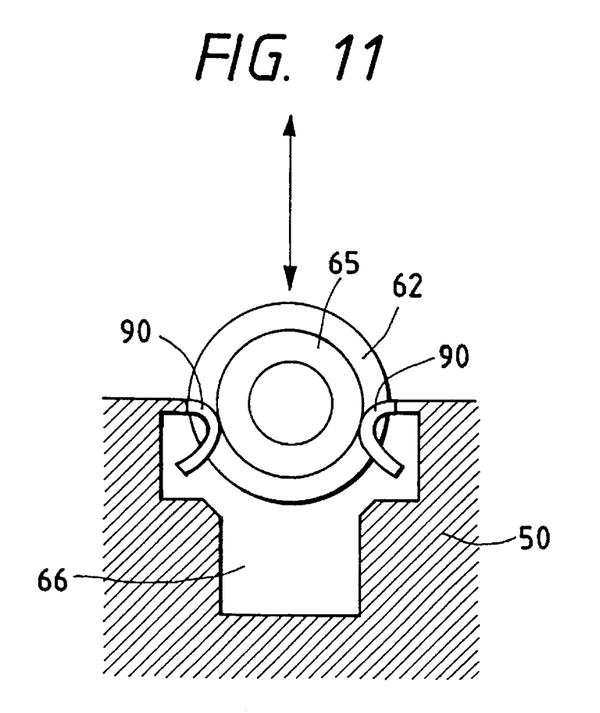
FIG. 11 is an explanatory drawing of mounting or dismounting of the cleaning roller.

The above embodiment was so arranged that the cleaning roller 62 provided at the fore end part on the card insertion side was supported so as to be free to ascend or descend and was urged downward by the plate spring 82, but a click portion may be provided at the upper edge of the support portion, as shown in FIG. 10. Namely, at both upper edges of each recess portion 66 having the U-shaped cross section and provided in the carrying base 50, 50, the click portion 91 is formed with vertical, semicircular projections 90 connected to the carrying base 50 only at the upper edge and opposed to each other. Elastically deforming the click portion 91, the cleaning roller 61 is brought from above into detachable engagement through bearing metal 65, as shown in FIG. 11, and the projecting portions 90 urge the cleaning roller 62 downward.

If the cleaning roller 62 becomes soiled because of repetitive use of the optical card carrying device 49, the cleaning roller 62 can be exchanged for another utilizing the elastic deformation of the click portion 91.

What is claimed is:

1. An information recording/reproducing apparatus for recording and/or reproducing information on or from a card-shaped information recording medium, comprising:

a carriage on which the medium is to be mounted;

conveying means for conveying the medium onto said carriage while maintaining contact with the medium, said conveying means including a card conveying mechanism located at substantially a center position of said carriage in a direction in which the medium is conveyed;

an optical head for recording/reproducing information onto and from the card; and moving means for moving said carriage relative to said optical head, wherein said conveying means is free from contact with the medium after the medium has been conveyed onto said carriage.

2. The apparatus according to claim 1, wherein said conveying mechanism is a semicircular rubber roller and wherein a flat surface of said rubber roller is placed in a state opposed to a surface of the medium after the medium has been conveyed onto said carriage, whereby said rubber roller is free from contact with the medium.

3. The apparatus according to claim 1, wherein said moving means moves said carriage in direction traversing a plurality of information tracks running in a longitudinal direction on the medium mounted on said carriage.

* * * * *

UNITED STATES PATENT AND TRADEMARK OFFICE
CERTIFICATE OF CORRECTION

PATENT NO. :  5,578,811
DATED      :  November 26, 1996
INVENTOR(S):  Susuki

It is certified that error appears in the above-indentified patent and that said Letters Patent is hereby corrected as shown below:

[57] ABSTRACT:

Line 10, "free contact" should read --free from contact--.

COLUMN 1:

Line 49, "4" should read --14--.

COLUMN 4:

Line 35, "56, 10 56." should read --56, 56--.

Signed and Sealed this

Twenty-seventh Day of May, 1997

Attest:

BRUCE LEHMAN

Attesting Officer

Commissioner of Patents and Trademarks